US008913097B2

(12) United States Patent
Oi

(10) Patent No.: US 8,913,097 B2
(45) Date of Patent: Dec. 16, 2014

(54) OPTICAL SCANNING DEVICE, IMAGING FORMING APPARATUS, AND OPTICAL ELEMENT

(71) Applicant: KYOCERA Document Solutions Inc., Osaka (JP)

(72) Inventor: Hironobu Oi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/797,654

(22) Filed: Mar. 12, 2013

(65) Prior Publication Data

US 2013/0251409 A1 Sep. 26, 2013

(30) Foreign Application Priority Data

Mar. 23, 2012 (JP) ................................ 2012-066629

(51) Int. Cl.

*B41J 15/14* (2006.01)
*B41J 27/00* (2006.01)
*G02B 7/02* (2006.01)
*G03G 15/043* (2006.01)
*G03G 15/04* (2006.01)

(52) U.S. Cl.

CPC ........ *G03G 15/0409* (2013.01); *G03G 15/0435* (2013.01); *G03G 15/04072* (2013.01)
USPC ............................ 347/242; 347/257; 359/819

(58) Field of Classification Search

USPC ......................... 347/224, 241–245, 256–258; 359/205.1, 206.1, 811, 812, 819
See application file for complete search history.

(56) References Cited

U.S. PATENT DOCUMENTS

| | | | | | |
|---|---|---|---|---|---|
| 6,657,760 | B2 * | 12/2003 | Fukita et al. | ............... | 359/198.1 |
| 7,719,561 | B2 * | 5/2010 | Tahk | ............................. | 347/242 |
| 8,520,137 | B2 * | 8/2013 | Lee et al. | ....................... | 348/374 |
| 2011/0242253 | A1 * | 10/2011 | Takahashi et al. | ............ | 347/118 |
| 2013/0258033 | A1 * | 10/2013 | Ryotaro | ........................ | 347/224 |

FOREIGN PATENT DOCUMENTS

| | | | | | |
|---|---|---|---|---|---|
| JP | 05-203889 | A | | 8/1993 | |
| JP | 2002277782 | A | * | 9/2002 | ............ G02B 26/10 |
| JP | 2008093886 | A | * | 4/2008 | ................. B41J 2/44 |
| JP | 2008268752 | A | * | 11/2008 | ............... G02B 7/00 |

* cited by examiner

*Primary Examiner* — Hai C Pham
(74) *Attorney, Agent, or Firm* — Studebaker & Brackett PC

(57) ABSTRACT

An optical scanning device includes an optical element and an optical base. The optical element includes a first bonding surface, while the optical base includes a second bonding surface. A groove in which a bonding agent flows is formed in at least one of the first bonding surface of the optical element and the second bonding surface of the optical base. The optical element is bonded and fixed to the optical base through the first bonding surface and the second boding surface by means of the bonding agent.

10 Claims, 7 Drawing Sheets

OPTICAL SCANNING DEVICE, IMAGING FORMING APPARATUS, AND OPTICAL ELEMENT

INCORPORATION BY REFERENCE

The present application claims priority under 35 U.S.C. §119 to Japanese Patent Application No. 2012-066629, filed Mar. 23, 2012. The contents of this application are incorporated herein by reference in their entirety.

BACKGROUND

The present disclosure relates to optical scanning devices in which an optical element is bonded and fixed to an optical base by means of a bonding agent, image forming apparatuses including such an optical scanning device, and optical elements.

In image forming apparatuses, such as copiers, printers, etc. that form images on a recording medium, such as paper by electrophotography, an image carrier of which surface is charged by a charger uniformly is subjected to exposure scanning by an optical scanning device to form an electrostatic latent image according to image information on the surface of the image carrier. The electrostatic latent image formed on the image carrier is developed with toner as a developer in a developing unit to be visualized as a toner image. Further, the toner image is transferred onto the recording medium through a transfer unit. The recording medium on which the toner image is thus transferred is conveyed to a fusing unit and then is heated and pressurized by the fusing unit to be subjected to fusing of the toner image. Thereafter, the recording medium to which the toner image is fused is ejected outside the apparatus. Upon ejection of the recoding medium outside the apparatus, a series of image forming operation is completed.

Incidentally, in the optical scanning device, light emitted from a light source, such as a laser diode (LD), or the like enters into a deflection means, such as a polygon mirror or the like through a collimator lens and a cylindrical lens. Then, the light deflected by the deflection means is imaged on an image carrier on a photoconductive drum or the like through an fθ lens. Subsequently, the image is subjected to exposure scan. In the optical scanning device, the optical elements, such as the collimator lens, the cylindrical lens, the fθ lens, etc. are directly fixed to an optical base by means of a bonding agent in order to reduce the number of parts.

Moreover, in order to maintain the high scanning performance of the optical scanning device, the optical elements, such as the fθ lens, etc. are bonded and fixed to the optical base with high accuracy. To do so, a positioning rib 119A is formed so as to protrude from an optical base 119, as shown in FIG. 6. An fθ lens 124, for example, abuts on the positioning rib 119A for positioning. Then, the positioned fθ lens 124 is fixed to the optical base 119 by means of a bonding agent 130.

However, in the case employing the fixing scheme as described with reference to FIG. 6, when the fθ lens 124 and the optical base 119 are thermally expanded by driving the optical scanning device or the like, the shear stress concentrates at bonding points. Because, (1) the fθ lens 124 cannot be moved relative to the optical base 119 because of abutment of the fθ lens 124 on the positioning rib 119A of the optical base 119; (2) the fθ lens 124 has a coefficient of linear expansion different from the optical base 119; and the like. As a result, the shear stress may overpower the bonding strength to cause the fθ lens 124 to come off from the optical base 119.

By contrast, a method as shown in FIGS. 7A and 7B has been proposed as still another technique for fixing an fθ lens.

Specifically, FIGS. 7A and 7B are cross sectional views showing the method for fixing an fθ lens. In the fixing method explained with reference to FIGS. 7A and 7B, in order to fix an fθ lens 224 to an optical base 219 by means of a bonding agent 230, the fθ lens 224 is positioned accurately by using a jig 250, as shown in FIG. 7A, and is bonded to the optical base 219. Then, the jig 250 is removed, as shown in FIG. 7B.

SUMMARY

An optical scanning device according to one aspect of the present disclosure includes an optical element and an optical base. The optical element includes a first bonding surface, while the optical base includes a second bonding surface. A groove in which a bonding agent flows is formed in at least one of the first bonding surface of the optical element and the second bonding surface of the optical base. The optical element is bonded and fixed to the optical base through the first bonding surface and the second boding surface by means of the bonding agent.

An image forming apparatus according to one aspect of the present disclosure includes an optical element and an optical base. The optical element includes a first bonding surface, while the optical base includes a second bonding surface. A groove in which a bonding agent flows is formed in at least one of the first bonding surface of the optical element and the second bonding surface of the optical base. The optical element is bonded and fixed to the optical base through the first bonding surface and the second boding surface by means of the bonding agent.

An optical element according to one aspect of the present disclosure is bonded and fixed to an optical base by means of a bonding agent. The optical element includes a bonding surface. A groove in which the bonding agent flows is formed in the bonding surface of the optical element. The optical element and the optical base are bonded and fixed together by means of the bonding agent through the bonding surface.

DETAILED DESCRIPTION

Embodiments of the present disclosure will be described below with reference to the accompanying drawings.

[Image Forming System]

Figure 1:
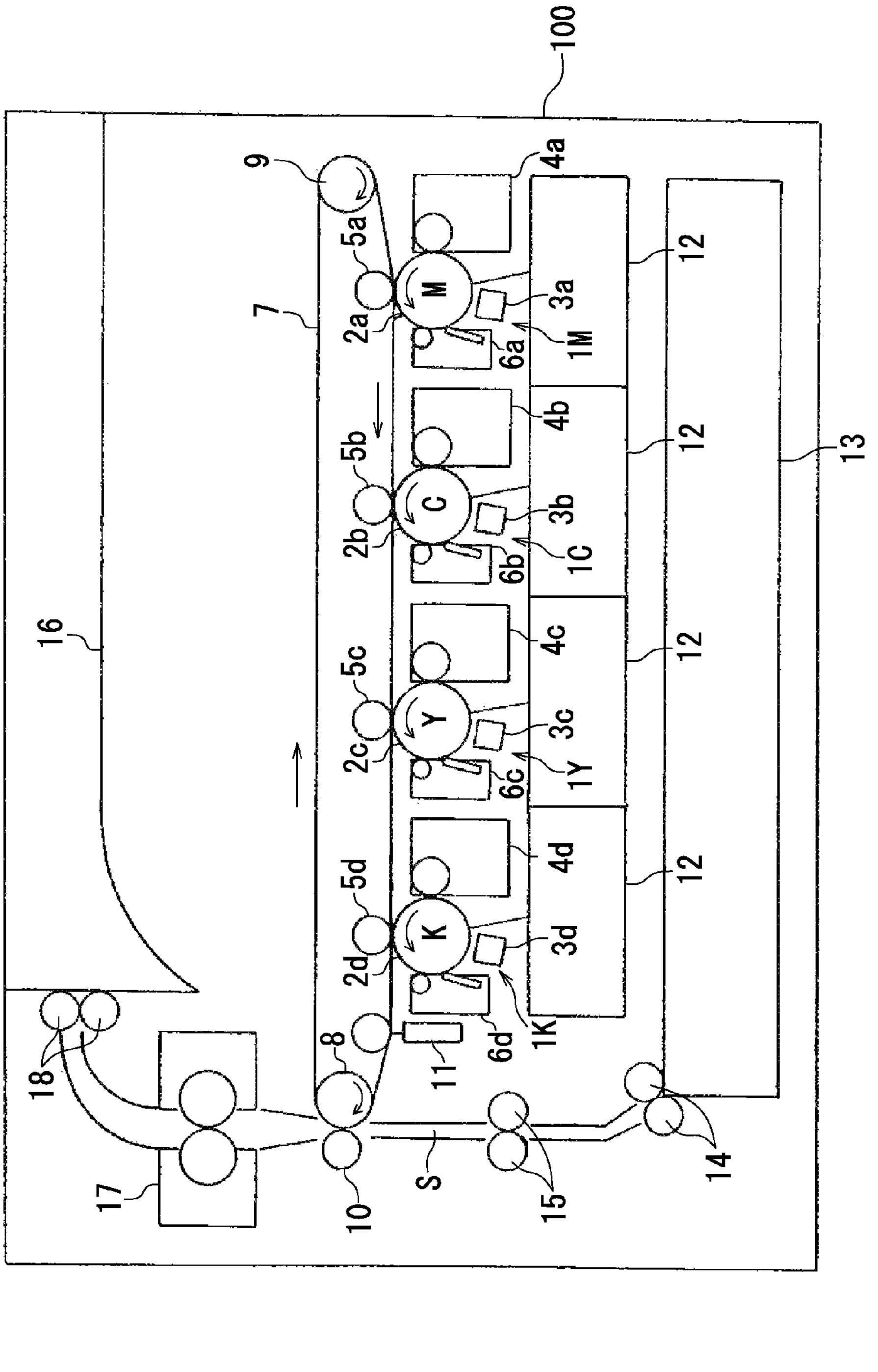
FIG. 1 is a side cross sectional view of an image forming apparatus (color laser printer) according to the present disclosure.

FIG. 1 is a side cross sectional view of a color laser printer as one embodiment of an image forming apparatus according to the present disclosure. The color laser printer shown in FIG. 1 is of tandem type. In the central part of a main body 100 of the color laser printer, a magenta image forming unit 1M, a cyan image forming unit 1C, a yellow image forming unit 1Y, and a black image forming unit 1K are arranged at regular intervals in tandem.

A photoconductive drum 2*a* as an image carrier is arranged in the magenta image forming unit 1M. A charger 3*a*, a developing unit 4*a*, a transfer roller 5*a*, and a cleaning unit 6*a* are arranged around the photoconductive drum 2*a*. A photoconductive drum 2*b* as an image carrier is arranged in the cyan image forming unit 1C. A charger 3*b*, a developing unit 4*b*, a transfer roller 5*b*, and a cleaning unit 6*b* are arranged around the photoconductive drum 2*b*. A photoconductive drum 2*c* as an image carrier is arranged in the yellow image forming unit 1Y. A charger 3*c*, a developing unit 4*c*, a transfer roller 5*c*, and a cleaning unit 6*c* are arranged around the photoconductive drum 2*c*. A photoconductive drum 2*d* as an image carrier is arranged in the black image forming unit 1K. A charger 3*d*, a developing unit 4*d*, a transfer roller 5*d*, and a cleaning unit 6*d* are arranged around the photoconductive drum 2*d*.

Here, the photoconductive drums 2*a*-2*d* are photoreceptors in dram shape and are driven and rotated at a predetermined processing speed in the directions (anticlockwise direction) indicated by the arrows in FIG. 1 by a drive motor (not shown). Further, each charger 3*a*-3*d* electrostatically charges the surface of the corresponding photoconductive drum 2*a*-2*d* uniformly to a predetermined potential with charged bias applied from a charged bias power supply (not shown).

Further, the developing units 4*a*-4*d* accommodate magenta (M) toner, cyan (C) toner, yellow (Y) toner, and black (K) toner, respectively, and allow the respective toner in corresponding colors to adhere to electrostatic latent images formed on the respective photoconductive drums 2*a*-2*d*, thereby visualizing the electrostatic latent images as toner images in the respective colors.

Furthermore, the primary transfer rollers 5*a*-5*d* are arranged so as to be capable of being in direct contact with the photoconductive drums 2*a*-2*d*, respectively, with an intermediate transfer belt 7 interposed. Hereinafter, respective contact portions between the photoconductive drums 2*a*-2*d* and the primary transfer rollers 5*a*-5*d* may be referred to as primary transfer portions in the present specification. The intermediate transfer belt 7 is wound between a drive roller 8 and a tension roller 9 so as to be capable of running on the upper surfaces of the photoconductive drums 2*a*-2*d*. The drive roller 8 is arranged so as to be capable of being in contact with a secondary transfer roller 10 with the intermediate transfer belt 7 interposed. Hereinafter, a contact portion between the drive roller 8 and the secondary transfer roller 10 may be referred to as a secondary transfer portion in the present specification. Further, an optical density sensor 11 is disposed in the vicinity of the drive roller 8 where the intermediate transfer belt 7 faces.

Moreover, four optical scanning devices 12 according to the present disclosure are arranged below the magenta image forming unit 1M, the cyan image forming unit 1C, the yellow image forming unit 1Y, and the black image forming unit 1K in the printer main body 100 so as to correspond to the magenta image forming unit 1M, the cyan image forming unit 1C, the yellow image forming unit 1Y, and the black image forming unit 1K, respectively. Further, a paper feed cassette 13 is detachably provided at the bottom of the printer main body 100 below the four optical scanning devices 12. A plurality of sheets of paper (not shown in the drawings) are accommodated and stacked in the paper feed cassette 13. A conveyance roller pair 14 is provided in the vicinity of the paper feed cassette 13. The conveyance roller pair 14 picks up the paper from the paper feed cassette 13 and sends out it sheet by sheet to a conveyance path S. The conveyance path S is a path extending in the vertical direction along the side of the printer main body 100.

In addition, a paper stop roller pair 15 is provided on the conveyance path S. The paper stop roller pair 15 makes the paper picked out from the paper feed cassette 13 to temporarily wait and then supplies it to the secondary transfer portion at predetermined timing.

Incidentally, the conveyance path S extends to an exit tray 16 provided on the upper surface of the printer main body 100. A fusing unit 17 and a paper delivery roller pair 18 are provided in the middle of the path to the exit tray 16.

Image forming operation by the color laser printer with the above configuration will be described next.

Upon issuance of an image formation start signal, the photoconductive drums 2*a*-2*d* are driven and rotated at a predetermined processing speed in the directions (anticlockwise direction) indicated by the arrows in FIG. 1 in the magenta image forming unit 1M, the cyan image forming unit 1C, the yellow image forming unit 1Y, and the black image forming unit 1K, respectively, and are charged by the respective chargers 3*a*-3*d* uniformly. Then, the optical scanning devices 12 each emit a light beam, which is modulated by a color image signal in corresponding color, to irradiate the surface of the corresponding photoconductive drum 2*a*-2*d*, thereby forming electrostatic latent images according to the color image signals in respective colors on the respective photoconductive drums 2*a*-2*d*.

Next, the developing unit 4*a* first allows the magenta toner to adhere to the electrostatic latent image formed on the photoconductive drum 2*a* of the magenta image forming unit 1M to visualize the electrostatic latent image as a magenta toner image. Developing bias having the same charge polarity as that of the photoconductive drum 2*a* is applied to the developing unit 4*a*. The magenta toner image is primarily transferred onto the intermediate transfer belt 7, which is driven and rotated in the direction indicated by the arrows in the drawing, at the primary transfer portion (transfer nip) between the photoconductive drum 2*a* and the transfer roller 5*a* by the operation of the transfer roller 5*a*. It is noted that the primary transfer bias having a polarity opposite to that of the toner is applied to the transfer roller 5*a*.

The intermediate transfer belt 7 to which the magenta toner image is primarily transferred as described above moves the magenta toner image to the next cyan image forming unit 1C. Then, also in the cyan image forming unit 1C, the cyan toner image formed on the photoconductive drum 2*b* is transferred in the same manner to be overlaid on the magenta toner image on the intermediate transfer belt 7 at the primary transfer portion between the photoconductive drum 2*b* and the transfer roller 5*b*.

Likewise, the yellow toner image and the black toner image respectively formed on the photoconductive drum 2*c* of the yellow image forming unit 1Y and the photoconductive dram 2*d* of the block image forming unit 1K are sequentially overlaid on the magenta toner image and the cyan toner image, which are transferred and overlaid on the intermediate transfer belt 7, at the respective primary transfer portions, thereby forming a full color toner image on the intermediate transfer belt 7. It is noted that non-transferred remaining toner, which has not been transferred to the intermediate transfer belt 7 and remains on the photoconductive drum 2*a*-2*d*, is removed by the respective cleaning units 6*a*-6*d*, thereby preparing each photoconductive drum 2*a*-2*d* for the next image formation.

Thereafter, the paper stop roller pair 15 conveys the paper, which is sent out from the paper feed cassette 13 to the conveyance path S by the conveyance roller pair 14, to the secondary transfer portion at the timing when the tip end of the full color toner image on the intermediate transfer belt 7 reaches the secondary transfer portion (transfer nip) between the drive roller 8 and the secondary transfer roller 10. Then, the secondary transfer roller 10 secondarily transfers the full color toner image from the intermediate transfer belt 7 to the paper in batch. It is noted that secondary transfer bias having a polarity opposite to that of the toner is applied to the secondary transfer roller 10.

Subsequently, the paper on which the full color toner image is transferred is conveyed to the fusing unit 17, and the full color toner image is heated and pressurized to be thermally fused on the surface of the paper. The paper delivery roller pair 18 delivers the paper, on which the toner image is fused, onto the exit tray 16, thereby completing a series of image forming operation.

[Optical Scanning Device]

Next, the basic configuration and operation of the optical scanning devices 12 according to the present disclosure will be described below with reference to FIG. 2. It is noted that the four optical scanning devices 12 have the same configuration, and therefore, only one optical scanning device 12 will be described below.

Figure 2:
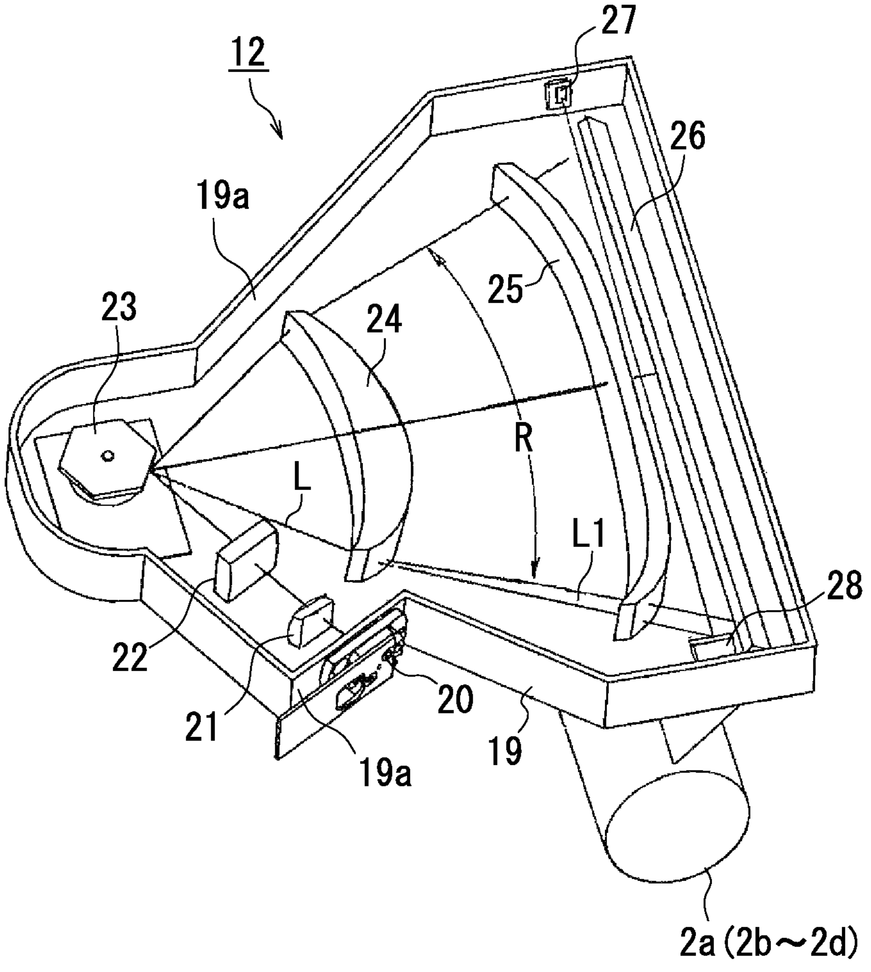
FIG. 2 is a perspective view of an optical scanning device according to the present disclosure.

FIG. 2 is a perspective view of an optical scanning device according to the present disclosure. The optical scanning device 12 includes an optical base 19 as a box body. A laser diode (LD) 20 as a light source is provided on a wall 19*a* standing perpendicular to the bottom of the optical base 19. Inside the optical base 19, a collimator lens 21, a cylindrical lens 22, and a polygon mirror 23 as a deflector are disposed in a line along the direction where the laser diode 20 emits a light beam L.

Inside the optical base 19, two fθ lenses of an fθ lens 24 and an fθ lens 25 and a steering mirror 26 are also disposed along the direction where the light beam L deflected by the polygon mirror 23 proceeds. In addition, a synchronization sensor 27 and a anterior-to-PD mirror 28 are disposed left and right, respectively, apart from an effective scanning range (actual scanning range used as a printing width) R of the light beam L between the fθ lens 25 and the steering mirror 26. The anterior-to-PD mirror 28 reflects to lead the light beam L1 to the synchronization sensor 27. It is noted that the light beam L1 is a light beam deflected by the polygon mirror 23 and proceeding in a light path deviated from the effective scanning range R.

Upon detection of the light beam L1, the synchronization sensor 27 outputs a synchronization signal. Any of various optical sensors may be employed as the synchronization sensor 27, such as a photodiode, a phototransistor, a photo IC, etc.

Moreover, in the present embodiment, the anterior-to-PD mirror 28 is mounted so as to incline at a predetermined angle with respect to the horizontal plane (main scanning surface) to reflect the light beam L1, thereby allowing the light beam L1 to enter into the synchronization sensor 27 in the sub scanning direction. By contrast, the light beam L deflected by the polygon mirror 23 and proceeding in the light path within the effective scanning range R proceeds horizontally in the steering mirror 26, thereby performing exposure scan in the main scanning direction on the photoconductive drum 2*a* (2*b*-2*d*).

The laser diode 20 of the optical scanning device 12 emits the light beam L modulated according to the image data. The collimator lens 21 makes the light beam L to be a parallel luminous flux. The parallel luminous flux is imaged on the reflection surface of the polygon mirror 23 by the cylindrical lens 22, which has power only in the sub scanning direction, and is then deflected by the polygon mirror 23, which is rotated at high speed. Next, the deflected light beam L is condensed by the fθ lens 24 and the fθ lens 25 at uniform speed, and is steered by the steering mirror 26, thereby forming a focal spot on the photoconductive drum 2*a* serving as a to-be-scanned surface. Subsequently, accompanied by formation of the focal spot, the photoconductive drum 2*a* is subjected to exposure scan in the main scanning direction to form an electrostatic latent image according to the color image signal in the magenta color onto the photoconductive drum 2*a*.

Further, when the anterior-to-PD mirror 28 reflects the light beam L1 to allow the light beam L to enter into the synchronization sensor 27 in the sub scanning direction, the synchronization sensor 27 detects the light beam L1 and outputs a synchronization signal. Then, according to the synchronization signal, start timing for exposure scan (writing) on the photoconductive drums 2*a*-2*d* by the light beam L is determined.

Next, a fixing structure of the fθ lens 24 will be described below with reference to FIGS. 3 and 4.

Figure 3:
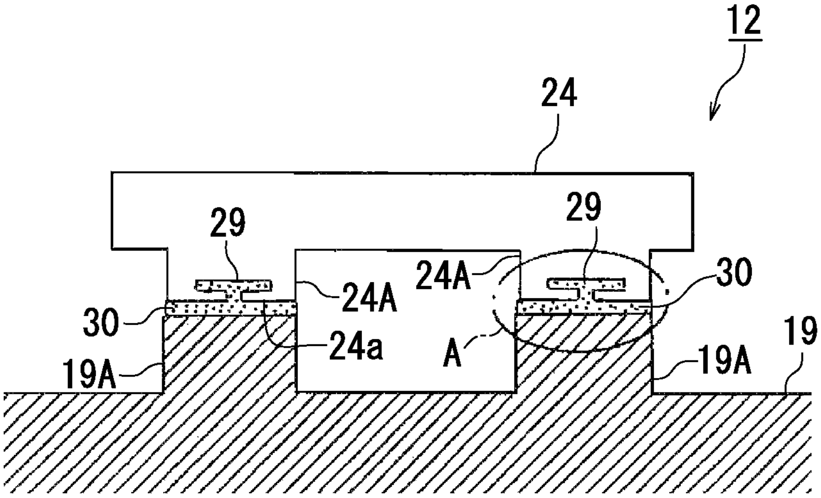
FIG. 3 is a cross sectional view showing a fixing structure of an fθ lens in the optical scanning device according to the present disclosure.

FIG. 3 is a cross sectional view showing the fixing structure of the fθ lens 24. FIG. 4 is an enlarged detailed view of the encircled part A in FIG. 3. The optical scanning device 12 according to one embodiment of the present disclosure includes an optical element (e.g., the fθ lens 24) and the optical base 19. Bosses (e.g., bosses 24A) including bonding surfaces protrude from at least one of the optical element and the optical base 19. Grooves (e.g., groves 29) in which a bonding agent 30 is filled are formed in the bonding surfaces of the bosses. The optical element is bonded and fixed to the optical base 19 through the bonding surfaces of the bosses by means of the bonding agent 30. The optical scanning device 12 according to one embodiment of the present disclosure will be described below in detail with reference to FIGS. 3 and 4.

As shown in FIG. 3, height positioning bosses 19A are formed at two points of the optical base 19 (two points in the longitudinal direction of the fθ lens 24 (transverse direction in FIG. 3)) so as to protrude perpendicularly to the bottom of the optical base 19 and integrally with the optical base 19.

On the other hand, two bosses 24A are formed at two bonding points on the lower surface of the fθ lens 24 (two points corresponding to the height positioning bosses 19A of the optical base 19) so as to protrude perpendicularly downward and integrally with the fθ lens 24. Each of the bosses 24A has a flat bonding surface 24*a* (first bonding surface) at the bottom thereof. The bonding surface 24*a* of each boss 24A is a surface in parallel to the boding surface (second bonding surface) of the optical base 19.

Figure 4:
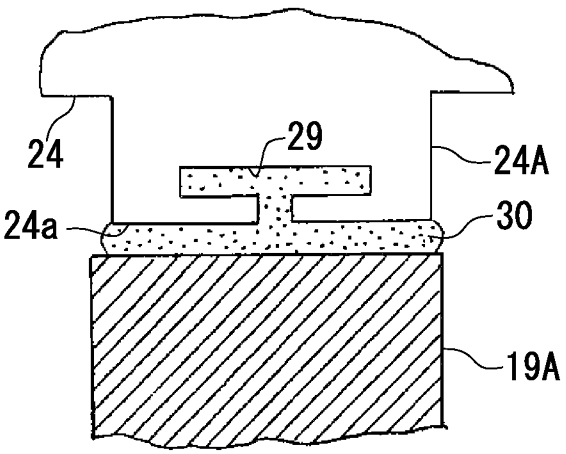
FIG. 4 is an enlarged detailed view of the encircled part A indicated in FIG. 3.

As shown in detail in FIG. 4, a groove 29 is formed in the bonding surface 24*a* of each boss 24A. The groove 29 has a T-shape (dovetail groove shape) open at the bonding surface 24*a*. The T-shape herein means a combination of an I-shape extending toward the depth of the boss 24A and a rotated I-shape horizontally widened at the depth of the boss 24A with a narrow opening at the bonding surface 24*a*. For example, in the case where the boss 24A protrudes perpendicularly downward from the fθ lens 24, as shown in FIG. 4, the groove 29 is formed in an I-shape from the opening at the bonding surface 24*a* to the depth of the boss 24A and then in a rotated I-shape at the depth of the boss 24A. Further, a bonding agent 30 flows in the groove 29.

Then, the fθ lens 24 is positioned in the following manner and is then bonded and fixed to the optical base 19.

Specifically, as shown in FIG. 3, the fθ lens 24 is placed on the two height positioning bosses 19A of the optical base 19. Then, the bonding surfaces 24*a* of the two bosses 24A are bonded to the corresponding two height positioning bosses 19A of the optical base 19 by means of the bonding agent 30 entered in the grooves 29. As a result, the two points in the longitudinal direction of the fθ lens 24 are fixed to the optical base 19.

In this way, in the present embodiment, the bonding agent 30 is entered in the grooves 29 formed in the bosses 24A of the fθ lens 24 to increase the bonding area of the fθ lens 24. This can increase the bonding strength of the fθ lens 24. Further, the bonding agent 30 entered in the grooves 29 is hardened to function to prevent the fθ lens 24 from falling off. Accordingly, even when the fθ lens 24 and the optical base 19, which are different from each other in coefficient of linear expansion, are thermally expanded, coming off of the fθ lens 24 from the optical base 19 can be restrained with the above simple structure. Further, in the present embodiment, with the grooves 29 in T-shape (dovetail groove shape) when viewed in cross section in which the bonding agent 30 is entered, the bonding agent 30, which is entered in the groves 29 and is hardened, can further enhance the effect of preventing the fθ lens 24 from falling off.

Figure 5:
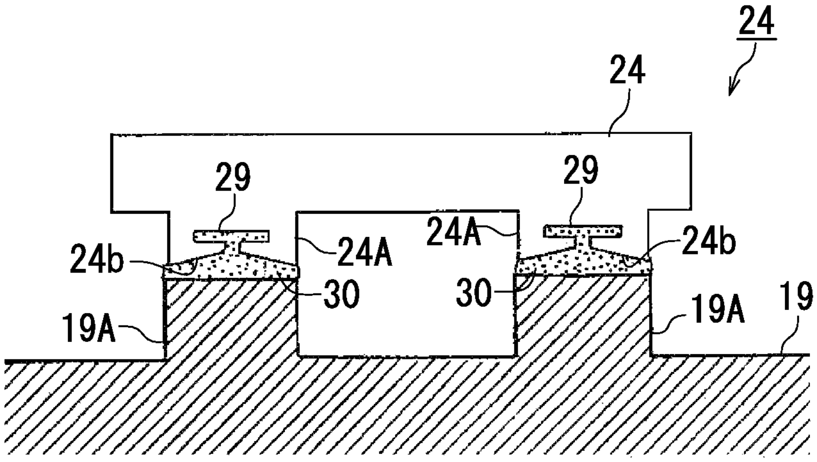
FIG. 5 is a cross sectional view showing a fixing structure of an fθ lens in the optical scanning device according to another embodiment of the present disclosure.
Figure 6:
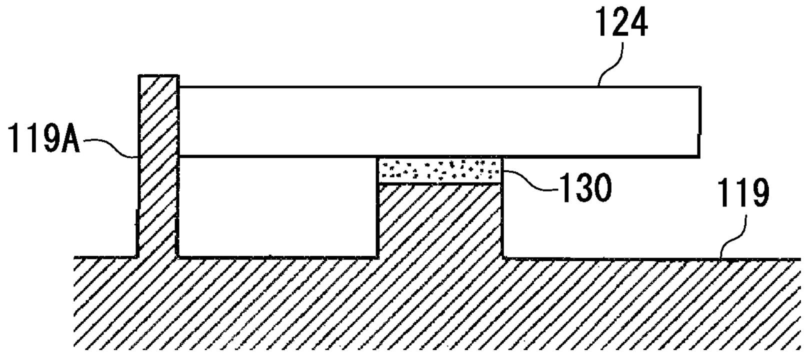
FIG. 6 is a cross sectional view showing a fixing structure of an fθ lens.
Figure 7A:
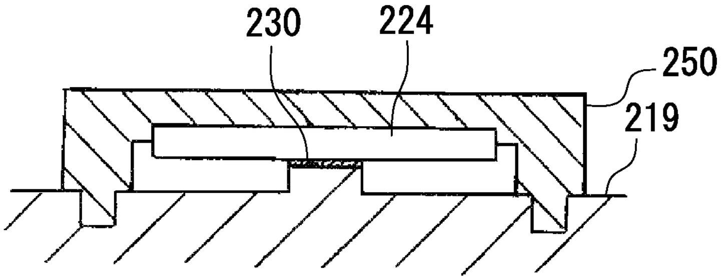
FIG. 7A is a cross sectional view showing a lens fixing method proposed in still another technique.
Figure 7B:
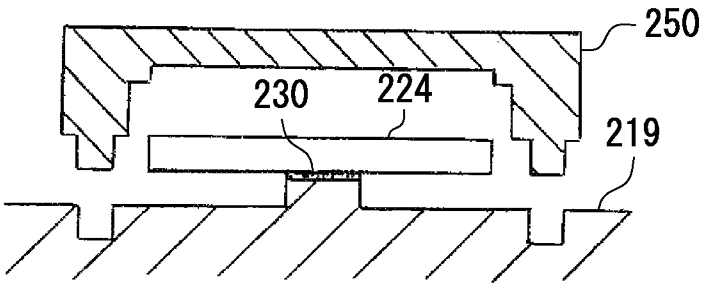
FIG. 7B is a cross sectional views showing the lens fixing method proposed in the still other technique.

Here, another embodiment of the fixing structure of the fθ lens 24 is shown in FIG. 5.

Specifically, FIG. 5 is a cross sectional view showing the other embodiment of the fixing structure of the fθ lens 24. In this embodiment, each of the bosses 24A of the fθ lens 24 has a bonding surface 24*b*. The bonding surface 24*b* of each boss 24A inclines relative to the bonding surface of the optical base 19. The bonding surface 24*b* is an inclined surface reduced in width as it goes toward the T-shaped groove 29. The "width" herein means the distance between a first inclined surface and a second inclined surface which incline toward the opening of the bonding surface 24*b*. The bonding surface 24*b* of each boss 24A may be in a shape of, for example, a mortar or a gable roof.

Accordingly, in the present embodiment, the bonding surface 24*b* of each boss 24A of the fθ lens 24 is an inclined surface reduced in width as it goes toward the groove 29. This means that the area of the bonding surface 24*b* is larger than that of the bonding area 24*a*. As such, the bonding area of the fθ lens 24 is further increased, and the bonding agent 30 can be easily entered each groove 29 along the bonding surface 24*b*. Thus, the bonding strength can be further increased, and assemblability can be enhanced.

In addition, where the laser beam printer shown FIG. 1 is provided with the optical scanning devices 12 according to the present embodiment, coming off of the fθ lens 24 of each optical scanning device 12 can be restrained, thereby stably forming desired images.

The embodiments of the present disclosure have been described with reference to FIGS. 1-5. It is noted that although the fixing structure of only one of the fθ lenses 24 has been described, the other optical elements, such as the other fθ lens 25, the collimator lens 21, the cylindrical lens 22, etc. can be bonded and fixed to the optical base 19 with the same fixing structure. Further, the embodiments have been described in which the grooves 29 are formed in the bosses 24A of the fθ lens 24 as an optical element, but formation of grooves similar to the grooves 29 in the height positioning bosses 19A of the optical base 19 can obtain the same advantages as above.

In detail, where the grooves are formed in the bosses 24A of the fθ lens 24, the bosses 24A of the fθ lens 24 have the bonding surfaces 24*a* in parallel to the bonding surface of the optical base 19 or the bonding surfaces 24*b* inclined relative to the bonding surface of the optical base 19. By contrast, in the case where the grooves are formed in the height positioning bosses 19A, each of height positioning bosses 19A has a bonding surface in parallel to the bonding surface of the corresponding optical element or a bonding surface inclined relative to the bonding surface of the corresponding optical element.

It is noted that besides the cases with the grooves formed only in bosses (e.g., the bosses 24A) of an optical element (e.g., the fθ lens 24) and with the grooves formed only in the bosses 19A of the optical base 19, the grooves can be formed in both the bosses of the optical element and the bosses 19A of the optical base 19. In the case where the grooves are formed in both the bosses of the optical element and the bosses 19A of the optical base 19, the bonding area is large compared to the case where the grooves are formed in only one of them. Accordingly, the optical element can be further firmly bonded to the optical base 19. As a result, coming off of the optical element from the optical base 19 can be restrained.

In addition, both of the bosses of an optical element and the bosses 19A of the optical base 19 protrude in the embodiments of the present disclosure. However, as long as a boss protrudes from at least one of the optical element and the optical base 19, the scope of the present disclosure is not limited to protrusion from both of them. For instance, an example in which only a boss protrudes only from an optical element, while no boss is provided at the optical base 19 is also within the scope of the present disclosure. Alternatively, an example in which only a boss protrudes only from the optical base 19, while no boss are provided at an optical element is also within the scope of the present disclosure.

Still, both the bosses of the optical element and the bosses 19A of the optical base 19 protrude in the embodiments of the present disclosure. However, the scope of the present disclosure is not limited to protrusion of the bosses of the optical element and the bosses 19A of the optical base 19. As long as a groove 29 in which the bonding agent 30 flows is formed in at least one of the first bonding surface of the optical element and the second bonding surface of the optical base 19, the bosses are not necessarily to protrude from at least one of the optical element and the optical base 19. An example in which the groove 29 in which the bonding agent 30 flows is formed in at least one of the first bonding surface of the optical element and the second bonding surface of the optical base 19 so that the optical element and the optical base 19 are bonded and fixed together by means of the bonding agent 30 through the first bonding surface and the second bonding surface is also within the scope of the present disclosure, free from the limitation that the bosses protrude from at least one of the optical element and the optical base 19.

Description has been made about the embodiments that apply the present disclosure to the color laser printer and the optical scanning devices 12 included therein. However, the present disclosure is, of course, applicable likewise to any other image forming apparatuses including monochrome printers, copiers, etc. and optical scanning devices included therein. In the case where any image forming apparatus includes the optical scanning devices according to any of the above embodiments, coming off of the optical elements included in the optical scanning devices from the optical base can be restrained, thereby stably forming desired images.

Furthermore, the number of the grooves formed in the bonding surface of each boss is not limited to one. As long as the bonding area between an optical element and the optical base can be increased, the number of the grooves formed in the bonding surface of each boss may be plural.

What is claimed is:

1. An optical scanning device comprising:

an optical element; and an optical base, wherein the optical element includes a first bonding surface, while the optical base includes a second bonding surface, a groove in which a bonding agent flows is formed in at least one of the first bonding surface of the optical element and the second bonding surface of the optical base, the optical element is bonded and fixed to the optical base through the first bonding surface and the second boding surface by the bonding agent, and the groove has a T-shape when viewed in cross section, the T-shape including a first portion linearly extending in a depth direction from the at least one of the first bonding surface and the second bonding surface, and a second portion linearly extending perpendicularly to the first portion and intersecting the first portion at a region separate from the at least one of the first bonding surface and the second bonding surface.

2. The optical scanning device of claim 1, wherein a boss protrudes from at least one of the optical element and the optical base, and the groove is formed in the boss.

3. The optical scanning device of claim 1, wherein at least one of the first bonding surface of the optical element and the second bonding surface of the optical base is an inclined surface reduced in width as it goes toward the groove, and the groove is formed in the inclined surface.

4. The optical scanning device of claim 1, wherein a boss protrudes from each of the optical element and the optical base.

5. An image forming apparatus comprising:

a photoconductive drum, a charger configured to charge the photoconductive drum, an optical scanning device configured to scan the photoconductive drum to form an electrostatic latent image on the photoconductive drum, and a developing unit configured to develop the electrostatic latent image on the photoconductive drum, wherein the optical scanning device includes an optical element; and an optical base, wherein the optical element includes a first bonding surface, while the optical base includes a second bonding surface, a groove in which a bonding agent flows is formed in at least one of the first bonding surface of the optical element and the second bonding surface of the optical base, the optical element is bonded and fixed to the optical base through the first bonding surface and the second boding surface by the bonding agent, and the groove has a T-shape when viewed in cross section, the T-shape including a first portion linearly extending in a depth direction from the at least one of the first bonding surface and the second bonding surface, and a second portion linearly extending perpendicularly to the first portion and intersecting the first portion at a region separate from the at least one of the first bonding surface and the second bonding surface.

6. The image forming apparatus of claim 5, wherein a boss protrudes from at least one of the optical element and the optical base, and the groove is formed in the boss.

7. The image forming apparatus of claim 5, wherein at least one of the first bonding surface of the optical element and the second bonding surface of the optical base is an inclined surface reduced in width as it goes toward the groove, and the groove is formed in the inclined surface.

8. The image forming apparatus of claim 5, wherein a boss protrudes from each of the optical element and the optical base.

9. An optical element which is bonded and fixed to an optical base by a bonding agent, wherein the optical element includes a bonding surface, a groove in which the bonding agent flows is formed in the bonding surface of the optical element, and the optical element and the optical base are bonded and fixed together by the bonding agent through the bonding surface, and the groove has a T-shape when viewed in cross section, the T-shape including a first portion linearly extending in a depth direction from the bonding surface, and a second portion linearly extending perpendicularly to the first portion and intersecting the first portion at a region separate from the bonding surface.

10. The optical element of claim 9, wherein the bonding surface is an inclined surface reduced in width as it goes toward the groove, and the groove is formed in the inclined surface.

* * * * *